US005723536A

United States Patent [19]

Baumbach et al.

[11] Patent Number: 5,723,536
[45] Date of Patent: Mar. 3, 1998

[54] AQUEOUS OR WATER-DILUTABLE BLOCKED POLYISOCYANATES AND THEIR USE FOR PREPARING POLYURETHANE CLEARCOATS HAVING SUBSTANTIALLY REDUCED THERMAL YELLOWING

[75] Inventors: Beate Baumbach; Eberhard König, both of Leverkusen; Lothar Kahl, Gladbach; Nusret Yuva, Wermelskirchen, all of Germany

[73] Assignee: Bayer Aktiengesellschaft, Leverkusen, Germany

[21] Appl. No.: 832,551

[22] Filed: Apr. 3, 1997

[30] Foreign Application Priority Data

Apr. 17, 1996 [DE] Germany ............ 196 15 116.3

[51] Int. Cl.$^6$ .................. C08J 3/00; C08K 3/20; C08L 75/00
[52] U.S. Cl. .................. 524/591; 524/539; 524/839; 524/840
[58] Field of Search ............ 524/539, 839, 524/840, 591

[56] References Cited

U.S. PATENT DOCUMENTS

| | | | |
|---|---|---|---|
| 4,098,933 | 7/1978 | Burkhardt et al. | 427/379 |
| 4,288,586 | 9/1981 | Bock et al. | 528/67 |
| 4,433,017 | 2/1984 | Goto et al. | 528/45 |
| 4,613,685 | 9/1986 | König et al. | 560/335 |
| 5,137,967 | 8/1992 | Brown | 524/840 |
| 5,216,078 | 6/1993 | Cook et al. | 525/124 |
| 5,294,665 | 3/1994 | Pedain et al. | 524/591 |
| 5,455,297 | 10/1995 | Pedain et al. | 524/591 |
| 5,504,178 | 4/1996 | Shaffer et al. | 528/45 |
| 5,510,443 | 4/1996 | Shaffer et al. | 528/45 |
| 5,523,377 | 6/1996 | Konig et al. | 528/45 |

FOREIGN PATENT DOCUMENTS

| | | |
|---|---|---|
| 2154980 | 2/1996 | Canada. |
| 649866 | 4/1995 | European Pat. Off. |

*Primary Examiner*—Patrick Niland
*Attorney, Agent, or Firm*—Joseph C. Gil; Thomas W. Roy

[57] ABSTRACT

The present invention relates to novel aqueous or water-dilutable blocked polyisocyanates and to their use for the production of one-component polyurethane coating compositions, which are stovable at relatively low temperatures of 130° to 150° C. and provide clear coatings having substantially reduced thermal yellowing.

2 Claims, No Drawings

AQUEOUS OR WATER-DILUTABLE BLOCKED POLYISOCYANATES AND THEIR USE FOR PREPARING POLYURETHANE CLEARCOATS HAVING SUBSTANTIALLY REDUCED THERMAL YELLOWING

BACKGROUND OF THE INVENTION

1. Field of the Invention

The present invention relates to novel aqueous or water-dilutable blocked polyisocyanates and to their use for the production of one-component polyurethane coating compositions, which are stovable at relatively low temperatures of 130° to 150° C. and provide clear coatings having substantially reduced thermal yellowing.

2. Description of the Prior Art

Multi-layer coatings having a glossy, polyurethane-based clear topcoat are becoming increasingly significant, especially in automotive lacquer coatings, by virtue of their excellent properties.

The clear lacquer acting as the uppermost layer of the structure must fulfil extremely severe requirements. In addition to properties such as hardness, scratch resistance and solvent and chemical resistance, a low stoving temperature and adequate overstoving resistance are also required.

However, one-component polyurethane stoving lacquers having a crosslinking component based on blocked polyisocyanates (BNCO) crosslinking agents have a marked tendency to yellow at elevated stoving temperatures or if the duration of the stoving operation is extended. This applies both to solvent-borne and to aqueous coating systems, which are becoming increasingly important due to the ever stricter emission guidelines relating to the release of solvents during lacquer application.

DE-A 2,456,469, EP-A 12,348 and DE-A 3,234,590 describe aqueous BNCO crosslinking agents based on biuretized 1,6-diisocyanatohexane. No statements are made regarding the thermal yellowing stability of the coatings produced therefrom. However, tests have demonstrated that such BNCO crosslinking agents perform very unsatisfactorily with regard to thermal yellowing in clear coatings used for original equipment manufacture (OEM) as demonstrated in Comparison Example 6). Also, when ε-caprolactam is used as the blocking agent, very high stoving temperatures of above 160° C. are required.

EP-A 576,952 and EP-A 566,953 describe aqueous, butanone oxime blocked polyisocyanates based on 4,4'-diisocyanatodicyclohexyl-methane (HMDI) (Desmodur W, Bayer AG) and mixtures thereof with trimerized 1,6-diisocyanatohexane, which allow a relatively lower crosslinking temperature, but also give rise to one-component clear coatings having unacceptably high thermal yellowing (see Comparison Examples 4 and 5).

Stabilizing measures to counter yellowing in solvent-borne systems are also known. EP-A 581,040 and EP-A 615,991 propose the addition and incorporation of certain hydrazide compounds. It is not stated whether these hydrazide compounds are also effective in the aqueous phase.

An object of the present invention is to provide aqueous or water-dilutable BNCO crosslinking agents which, when combined with aqueous polyol components, allow for the production of one-component polyurethane coating compositions, which may be stoved at relatively low temperatures and have substantially reduced thermal yellowing.

This object may be achieved with the aqueous or water-dilutable blocked polyisocyanates according to the invention, which are distinguished by excellent overstoving resistance and relatively low stoving temperatures of 130° to 150° C.

SUMMARY OF THE INVENTION

The present invention relates to aqueous or water-dilutable blocked polyisocyanates, which are based on the reaction product of a) 40 to 80 wt. % of a polyisocyanate having an isocyanurate group content (calculated as $C_3N_3O_3$; molecular weight=126) of 2 to 30 wt. % and prepared from one or more diisocyanates having a molecular weight of 140 to 350 with b) 5 to 30 wt. % of one or more reversible blocking agents for isocyanate groups which are monofunctional for purposes of the isocyanate addition reaction, c) 0.5 to 15 wt. % of one or more stabilizing components which are mono- or difunctional for purposes of the isocyanate addition reaction and have 1 to 2 hydrazide groups and a molecular weight of 70 to 300, d) 5 to 30 wt. % of a non-ionic/hydrophilic structural component containing at least one compound which is mono- or difunctional for purposes of the isocyanate addition reaction and contains at least one lateral or terminal hydrophilic polyether chain, e) 0 to 15 wt. % of an anionic or potential anionic-structural component containing one or more compounds having at least one isocyanate-reactive group and at least one group capable of salt formation, which may optionally be present in at least partially neutralized form, f) 0 to 15 wt. % of one or more (cyclo)aliphatic polyamines having 2 to 3 amino groups and a molecular weight of 60 to 300 and g) 0 to 15 wt. % of one or more polyhydric alcohols having 2 to 4 hydroxyl groups and a molecular weight of 62 to 250, wherein the sum of the percentages of a) to g) is 100, based on the weight of components a) to g), and wherein the mounts of these components are selected such that i) the content of isocyanurate groups (calculated as $C_3N_3O_3$; molecular weight=126) is at least 2 wt. %, ii) the content of blocked isocyanate groups (calculated as NCO; molecular weight=42) is 5 to 11 wt. % and iii) the content of chemically bound hydrazide groups (calculated as HN—NH; molecular weight=30) is 0.1 to 3.0 wt. %.

The present invention also relates to the use of the aqueous or water-dilutable blocked polyisocyanates in combination with water soluble or water dispersible polyhydroxyl compounds for the production of aqueous stoving lacquers.

DETAILED DESCRIPTION OF THE INVENTION

The aqueous or water-dilutable blocked polyisocyanates according to the invention are prepared by reacting A) 100 equivalent-% of a (cyclo)aliphatic polyisocyanate component containing isocyanurate groups with B) 60 to 85 equivalent-% of one or more reversible, monofunctional blocking agents for isocyanate groups, C) 1 to 20 equivalent-% of one or more stabilizing components containing hydrazide groups, D) 1 to 25 equivalent-% of a non-ionic/hydrophilic structural component containing ethylene oxide units, E) 0 to 25 equivalent-% of an anionic or potential anionic structural component containing carboxyl groups, F) 0 to 15 equivalent-% of one or more (cyclo)aliphatic polyamines and G) 0 to 15 equivalent-% of one or more polyhydric alcohols, wherein the amounts of the reactants are selected such that the equivalent ratio of isocyanate groups of component A) to isocyanate-reactive groups of components B), C), D), E), F) and G) is 1:0.8 to 1:1.2.

Starting component A) is selected from organic polyisocyanates which are prepared from diisocyanates having a molecular weight of 140 to 350 and have an isocyanurate group content (calculated as $C_3N_3O_3$; molecular weight= 126) of 2 to 30 wt. %. Suitable diisocyanates include 4,4'-diisocyanatodicyclohexylmethane (Desmodur W, Bayer AG), 1-isocyanato-3,3,5-trimethyl-5-isocyanatomethylcyclo-hexane (IPDI), 1,6-diisocyanatohexane (HDI) or mixtures of these polyisocyanates. Polyisocyanate component A) is produced from these diisocyanates using known methods, as described, for example, in *J. prakt. Chem.* 336 (1994) and in EP-A 3 765 and EP-A 649 866.

Oximes and/or pyrazoles are used as the reversible monofunctional blocking agents B). Butanone oxime and/or 3,5-dimethylpyrazole are preferred blocking agents.

Component C) is selected from mono- and/or difunctional carboxylic acid hydrazides having a molecular weight of 70 to 300, such as adipic acid dihydrazide, benzoic acid hydrazide, p-hydroxybenzoic acid hydrazide, isomeric terephthalic acid hydrazides, N-2,2,6,6-tetramethyl-4-piperidinyl-N-aminooxamide (Luchem HA-R 100, Elf Atochem), 3-(4-hydroxy-3,5-di-t-butylphenyl)propionic acid hydrazide, 2-hydroxy-3-t-butyl-5-methylphenylacetic acid hydrazide or mixtures of these compounds. Other effective hydrazides are addition products prepared from cyclic carbonates and hydrazine as are described in EP-A 654,490 and EP-A 682,051. Examples include the addition products of 1 mole of hydrazine and 1 mole of propylene carbonate and 1 mole of hydrazine and 2 moles of propylene carbonate. Preferred stabilizers are adipic acid dihydrazide and N-2,2,6,6-tetramethyl-4-piperidinyl-N-aminooxamide.

Component D) is selected from one or more non-ionic/ hydrophilic compounds containing one or two groups isocyanate-reactive groups, in particular hydroxyl groups. At least 80 wt. %, preferably 100 wt. %, of the polyether chains of these compounds contain ethylene oxide units. Other alkylene oxides include propylene oxide. Suitable non-ionic/hydrophilic structural compounds include monofunctional polyethylene glycol monoalkyl ethers having molecular weights of 350 to 3000 (for example Breox 350, 550, 750, BP Chemicals). The preferred molecular weight is between 600 and 900.

Component E) is selected from one or more compounds containing anionic or potential anionic groups and having at least one isocyanate-reactive group. These compounds are preferably carboxylic acids containing at least one, preferably one or two hydroxyl groups, or salts of these hydroxycarboxylic acids. Suitable acids include 2,2-bis-(hydroxymethyl)alkanecarboxylic acids, such as dimethylolacetic acid, 2,2-dimethylolpropionic acid, 2,2-dimethylolbutyric acid, 2,2-dimethylol-pentanoic acid, dihydroxysuccinic acid, hydroxypivalic acid and mixtures of these acids. Dimethylolpropionic acid and/or hydroxypivalic acid are preferably used as component E).

The free acid groups, in particular carboxyl groups, are considered to be potential anionic groups, while the salt groups, in particular carboxylate groups, obtained by neutralization of the acids with bases are considered to be anionic groups.

Component F) is selected from di-, tri- and/or tetrafunctional substances having a molecular weight of 60 to 300 and containing amino groups. Examples include ethylenediamine, 1,2- and 1,3-diaminopropane, 1,3-, 1,4- and 1,6-diaminohexane, 1,3-diamino-2,2-dimethylpropane, 1-amino-3,3,5-trimethyl-5-aminomethylcyclo-hexane (IPDA), 4,4'-diaminodicyclohexylmethane, 2,4- and 2,6-diamino-1-methyl-cyclohexane, 4,4'-diamino-3,3'-dimethyldicyclohexylmethane, 1,4-bis-(2-amino-prop-2-yl) cyclohexane and mixtures of these compounds.

Component G) comprises di-, tri- and/or tetrafunctional substances having a molecular weight of 62 to 250 and containing hydroxyl groups, such as ethylene glycol, propylene glycol, 1,4-butanediol, 1,6-hexanediol, glycerol, trimethylol-ethane, trimethylolpropane, the isomeric hexanetriols, pentaerythritol and mixtures of these compounds.

The blocked polyisocyanates according to the invention are produced from the starting components A) to G) in multiple stages, wherein the amounts of the reactants are selected such that the equivalent ratio of isocyanate groups of component A) to isocyanate-reactive groups of components B), C), D), E), F) and G) is 1:0.8 to 1:1.2, preferably 1:0.9 to 1.1.

The carboxyl group of component E), the water or solvent used to prepare the solutions or dispersions of the polyurethanes, and the neutralizing agent used to neutralize the carboxyl groups are not included in the calculation of this equivalent ratio.

Component C) is used in an mount such that the blocked polyisocyanates contain 0.1 to 3.0 wt. %, preferably 0.1 to 1.0 wt. %, of chemically bound hydrazide groups (calculated as HN—NH, molecular weight=30).

Component D) is used in an mount such that the blocked polyisocyanates contain 0.1 to 5.0 wt. %, preferably 0.5 to 3.0 wt. %, of ethylene oxide units (calculated as $C_2H_4O$, molecular weight=44) incorporated in terminally or laterally arranged polyether chains.

The quantity of component E) is calculated such that the blocked polyisocyanates contain 0.1 to 1.5 wt. %, preferably 0.5 to 0.7 wt. %, of chemically incorporated carboxyl groups (calculated as COOH, molecular weight=45), wherein the total quantity of ethylene oxide units and carboxyl groups is sufficient to ensure the solubility or dispersibility of the blocked polyisocyanates in water.

There are two preferred embodiments of the blocked polyisocyanates according to the invention:

a high-solids embodiment, in which the blocked polyisocyanate is present as a 65 to 85 wt. % solution in an organic solvent and is not dispersed in water until the preparation of the coating compositions and an aqueous embodiment, in which the blocked polyisocyanate is dissolved or dispersed at a resin solids content of 20 to 50 wt. % in water.

In both embodiments, hydrophilic components D) and E) are initially introduced in a first processing stage and reacted at a temperature of 80° to 100° C., preferably at 90° C., with polyisocyanate component A) to chemically incorporate the hydrophilic agents into the polyisocyanate. The reaction mixture is then cooled to 70° C. and the blocking agent B) is added until the theoretically calculated NCO content is reached. The temperature should not exceed 80° C. during the reaction.

Stabilizing components C) and chain extenders F) and G) may be incorporated before or during the dissolution or dispersion operation.

In the high-solids embodiment, components C), F) and G) are preferably dissolved in an organic solvent and added to the reaction mixture. The mount of the organic solvent is calculated such that 65 to 85 wt. % solutions are obtained. Suitable solvents include N-methyl-pyrrolidone, methoxypropyl acetate and diethylene glycol monobutyl ether acetate.

In the aqueous embodiment, components C), F) and G) are preferably dissolved in water and the reaction mixture is dispersed in this solution with thorough stirring. The quantity of water used as the dispersing medium is calculated so that dispersions having resin solids contents of 20 to 50 wt. %, preferably 30 to 40 wt. %, are obtained.

The base required for at least partially neutralizing the carboxyl groups may be added before, during or after the dispersion stage. Suitable bases include ammonia, N-methylmorpholine, dimethyl-isopropanolamine, triethylamine, dimethylethanolamine, methyldiethanolamine, triethanolamine, morpholine, tripropylamine, ethanol, triisopropanolamine, 2-diethylamino-2-methyl-1-propanol and mixtures of these and/or other neutralizing agents. Sodium hydroxide, lithium hydroxide and potassium hydroxide are also suitable, although less preferred, as neutralizing agents. Dimethylethanolamine is the preferred neutralizing agent.

The aqueous or water-dilutable blocked polyisocyanates according to the invention are valuable crosslinking resins for organic polyhydroxyl compounds in the production of stoving lacquers. They may be used instead of the blocked polyisocyanates previously used for this purpose and are distinguished by providing polyurethane coatings having substantially reduced thermal yellowing at relatively low stoving temperatures of 130° to 150° C.

Suitable polyhydroxyl compounds and other details relating to the production and use of such stoving lacquers may be found in the relevant literature. A particularly preferred use for the products according to the invention are as crosslinking agents for stoved clear polyurethane coating compositions, which are especially used as topcoats, especially in automotive, multi-layer coatings. These polyhydroxyl compounds used as co-reactants wit the blocked polyisocyanates according to the invention are known aqueous or water-dilutable binders based on polyesterpolyols, polyacrylatepolyols, polyurethanepolyols and mixtures thereof.

EXAMPLES

Unless otherwise stated, all parts and percentages in the following examples relate are based on weight and all properties are based on the weight of the dispersion or solution.

A polyester/polyacrylate dispersion produced in accordance with the process described in DE-A 4,427,227 (Canadian Published Application 2,154,980) was used in the following examples. For the preparation of the polyester/polyacrylate dispersion the same procedure is followed as in DE-A 4,427,227.

1710 g of trimethylol propane, 5310 g of neopentylglycol, 5524 g of phthalic anhydride, 332 g of maleic anhydride and 2121 g of isophthalic acid are weighed into an apparatus equipped with a stirrer, a thermometer, heating means and a distillation head and the mixture is heated to 140° C. over a period of 1 hour. Then it is heated to 200° C. over a period of 6 hours and condensed at this temperature with the elimination of water until the outflow viscosity (in a DIN 4 cup) at 55% solids in MPA at 23° C. has increased to 52–55s. The resulting product (polyester II of DE-A 4,427,227) has an outflow viscosity of 52.5s (in a DIN 4 cup), an acid number of 6.7 mg KOH/g substance and an OH number of 140 mg KOH/g substance.

500 g of the polyester II mentioned above and 108 g of butyl glycol are weighed into an apparatus equipped with a stirrer, a thermometer, heating means and a cooling device and the mixture is heated to 120° C. Then a mixture of 430 g of butyl acrylate, 240 g of methyl methacrylate, 300 g of hydroxyethyl methacrylate and 10 g n-dodecylmercaptan is added over a period of 2 hours, followed by a mixture of 215 g of butyl acrylate, 120 g of methyl methacrylate, 150 g of hydroxyethyl methacrylate, 45 g of acrylic acid and 5 g of n-dodecylmercaptan over a period of 1 hour. Concurrently with the monomer mixtures 53.6 g of tert.-butyl per-2-ethyl hexanoate (70% solids in a hydrocarbon mixture) are added over a period of 4 hours. When the addition of peroxide is complete the mixture is subsequently stirred for a period of 2 hours at 120° C. and then cooled to 100° C. 48.9 g of dimethylethanolamine are added and the mixture is homogenised. It is then dispersed in 2829.9 g of water and a product having the following characteristic data is obtained:

| | |
|---|---|
| solids content: | 40.6% |
| viscosity: | 2,400 mPas (23° C.) |
| OH number: | 153.2 mg KOH/g solid resin |
| acid number: | 21.1 mg KOH/g solid resin |
| OH content: | 1.9% (based on the dispersion) |
| equivalent weight: | 894.70 g |

EXAMPLE 1

(according to the invention)

Production of an aqueous blocked polyisocyanate according to the invention

Formulation:

486.67 g (1.00 equiv) of a lacquer polyisocyanate containing allophanate and isocyanurate groups and based on 4,4'-diiso-cyanatodicyclohexylmethane (Desmodur W, Bayer AG), produced in accordance with the process described in EP-A 649 866, present as a 70% solution in methoxypropyl acetate/xylene (1:1): For the preparation of the Desmodur W-allophanate/trimer the same procedure is followed as described in EP-A 649 866. The catalyst used is a 4.4% by weight solution of N,N,N-trimethyl-N-benzylammonium hydroxide in n-butanol (the catalyst solution of Example 1 of EP-A 649 866).

33 g of n-butanol are added to 1167 g of Desmodur W and the mixture is stirred for 1 hour at 90° C. When urethanisation is complete, approx. 4 g of the catalyst solution is added at 90° C. When the NCO content of the reaction mixture has reached 25.6%, the reaction is terminated by adding 0.3 g of a 25% solution of dibutyl phosphate in Desmodur W. Any excess of monomeric Desmodur W is removed by thin-layer distillation. The isolated solid resin is dissolved in MPA/xylene (1:1) to a concentration of 70% and a product with the following characteristic data is obtained:

|         |                                                                                                                                                               |
|---------|---------------------------------------------------------------------------------------------------------------------------------------------------------------|
|         | solids content: 70%                                                                                                                                           |
|         | NCO content: 8.63%                                                                                                                                            |
|         | viscosity: 300 mPas (23° C.)                                                                                                                                  |
|         | monomeric Desmodur W: 0.20%                                                                                                                                   |
| 75.00 g | (0.10 equiv) of a monofunctional polyethylene glycol monomethyl ether (monohydroxy polyether) having an average molecular weight of 750 (Carbowax 750, Union Carbide) |
| 69.70 g | (0.80 equiv) of butanone oxime                                                                                                                                |
| 2.55 g  | (0.03 equiv) of isophorone diamine (IPDA)                                                                                                                     |
| 2.61 g  | (0.03 equiv) of adipic acid dihydrazide (ASDH)                                                                                                                |
| 764.80 g | of deionized water                                                                                                                                           |

Method 75.00 g of the monohydroxy polyether were introduced into a standard stirrer apparatus and heated to 90° C. 486.67 g of the lacquer polyisocyanate were rapidly stirred in. An NCO content of 6.28% was reached within approximately 30 minutes (theoretical NCO content 6.73%). The reaction mixture was then cooled to 70° C. and 69.70 g of butanone oxime were added within approximately 30 minutes in such a manner that a temperature of 80° C. was not exceeded due to the exothermic reaction. When an NCO content of 0.25% was reached (theoretical NCO content: 0.66%), the reaction mixture was cooled to 70° C. and dispersed within approximately 30 minutes with thorough stirring into a solution of 2.55 g of IPDA and 2.61 g of ASDH in 764.80 g of deionized water (approximately 23° C.). A milky dispersion having a solids content of 35% and a draining time of 14 seconds (DIN 4/23° C.) was obtained. The NCO equivalent weight of the dispersion (based on the blocked isocyanate groups) was 1750.00 g. The blocked polyisocyanate had the following properties:

Isocyanurate group content: 4.86% (calculated as C3N3O3; molecular weight=126)

Blocked isocyanate group content: 6.85% (calculated as NCO; molecular weight=42)

Hydrazide group content: 0.18% (calculated as HN—NH; molecular weight=30)

EXAMPLE 2

(according to the invention)

Production of an aqueous blocked polyisocyanate according to the invention

Formulation:

355.93 g (1.00 equiv) of a lacquer polyisocyanate containing isocyanurate groups and based on IPDI, produced in accordance with the process described in EP-A 3 765 (U.S. Pat. No. 4,288,586, herein incorporated by reference), present as a 70% solution in solvent naphtha 100: For the preparation of the IPDI trimer the same procedure is followed as described in EP-A 3 765. The catalyst used is a 6% by weight solution of 2-hydroxyethyltrimethyl ammonium hydroxide in 2-ethylhexanol/methanol (catalyst solution I-a of EP-A 3 765).

4000 g of IPDI are reacted at 60°–80° C. with approx. 25 g of the catalyst solution while undergoing trimerisation, until an NCO content of 30% is reached. The mixture is subsequently stirred for 30 minutes at approx. 100° C. and then subjected to thin-layer distillation at 170° C./0.1 mbar. The isolated solid resin is dissolved in SN 100 to a concentration of 70% and a product having the following characteristic data is obtained:

|         |                                                                                    |
|---------|------------------------------------------------------------------------------------|
|         | solid content: 70%                                                                 |
|         | NCO content: 11,80%                                                                |
|         | viscosity: 2,200 mPas (23° C.)                                                     |
|         | monomeric IPDI: 0.15%                                                              |
| 75.00 g | (0.10 equiv) of the monohydroxy polyether from Example 1                           |
| 69.70 g | (0.80 equiv) of butanone oxime                                                     |
| 2.55 g  | (0.03 equiv) of IPDA                                                               |
| 2.61 g  | (0.03 equiv) of ASDH                                                               |
| 622.38 g | of deionized water                                                                |

Method 75.00 g of the monohydroxy polyether were introduced into a standard stirrer apparatus and heated to 90° C. 355.93 g of the lacquer polyisocyanate were rapidly stirred in. An NCO content of 8.61% was reached within approximately 30 minutes (theoretical NCO content: 8.77%). The reaction mixture was then cooled to 70° C. and 69.70 g of butanone oxime were added within approximately 30 minutes in such a manner that a temperature of 80° C. was not exceeded due to the exothermic reaction. When an NCO content of 0.54% was reached (theoretical NCO content: 0.84%), the reaction mixture was cooled to 70° C. and dispersed within approximately 30 minutes with thorough stirring into a solution of 2.55 g of IPDA and 2.61 g of ASDH in 622.38 g of deionized water (approximately 23° C.). A milky dispersion having a solids content of 35% and a draining time of 17 seconds (DIN 4/23° C.) was obtained. The NCO equivalent weight of the dispersion (based on the blocked isocyanate groups), was 1409.40 g. The blocked polyisocyanate had the following properties:

Isocyanurate group content: 13.36% (calculated as C3N3O3; molecular weight=126)

Blocked isocyanate group content: 8.42% (calculated as NCO; molecular weight=42)

Hydrazide group content: 0.23% (calculated as HN—NH; molecular weight=30)

EXAMPLE 3

(according to the invention)

Production of a water-dilutable blocked polyisocyanate according to the invention Formulation:

|          |                                                                                                      |
|----------|------------------------------------------------------------------------------------------------------|
| 355.93 g | (1.00 equiv) of the lacquer polyisocyanate of Example 2                                              |
| 75.00 g  | (0.10 equiv) of the monohydroxy polyether of Example 1                                               |
| 76.90 g  | (0.80 equiv) of 3,5-dimethylpyrazole                                                                 |
| 5.11 g   | (0.06 equiv) of IPDA                                                                                 |
| 4.84 g   | (0.04 equiv) of N-2,2,6,6-tetramethyl-4-piperidinyl-N-aminooxamide (Luchem HA-R 100 ®; Elf Atochem) |
| 63.96 g  | of N-methylpyrrolidone (NMP)                                                                         |

Method:

75.00 g of the monohydroxy polyether were introduced into a standard stirrer apparatus and heated to 90° C. 355.93 g of the lacquer polyisocyanate were rapidly stirred in. An NCO content of 8.61% was reached within approximately 30 minutes (theoretical NCO content: 8.77%). The reaction mixture was then cooled to 70° C. and 76.90 g of dimethylpyrazole were added within approximately 30 minutes in such a manner that a temperature of 80° C. was not exceeded due to the exothermic reaction. When an NCO content of 0.54% was reached (theoretical NCO content: 0.83%), a solution of 5.11 g of IPDI and 4.84 g of the amide stabilizer in 69.36 g of NMP were added at once and the reaction mixture was stirred for approximately 30 minutes at 70° C. After this period, no NCO groups were detected in the solution by IR spectroscopy and the batch was cooled to room temperature. A virtually colorless solution having a solids content of 70% and a viscosity of 31,000 mPa.s (23° C.) was obtained. The NCO equivalent weight of the solution (based on the blocked isocyanate groups) was 734.27 g. The blocked polyisocyanate had the following properties:

Isocyanurate group content: 12.97% (calculated as $C_3N_3O_3$; molecular weight=126)

Blocked isocyanate group content: 8.18% (calculated as NCO; molecular weight=42)

Hydrazide group content: 0.29% (calculated as HN—NH; molecular weight=30)

EXAMPLE 4

(Comparison Example)

An aqueous blocked polyisocyanate based on HMDI, produced in accordance with Example 2 of EP-A 576,952 (U.S. Pat. No. 5,294,665, herein incorporated by reference) and having a solids content of 35% and a viscosity of 5000 mPa.s (23° C.) was used as a comparison. The NCO equivalent weight (based on the blocked isocyanate groups) was 2625.00 g. The blocked polyisocyanate had the following properties:

Isocyanurate group content: 0% (calculated as $C_3N_3O_3$; molecular weight=126)

Blocked isocyanate group content: 4.57% (calculated as NCO; molecular weight=42)

Hydrazide group content: 0% (calculated as HN—NH; molecular weight=30)

EXAMPLE 5

(Comparison Example)

An aqueous blocked polyisocyanate, based on a mixture of trimerized HDI and HMDI, produced in accordance with Example 2 of EP-A 566,953 (U.S. Pat. No. 5,455,297, herein incorporated by reference) and having a solids content of 40% and a viscosity of 25,000 mPa.s (23° C.) was used as a comparison. The NCO equivalent weight (based on the blocked isocyanate groups) was 954.55 g. The blocked polyisocyanate has the following properties:

Iaocyanurate group content: 11.25% (calculated as $C_3N_3O_3$; molecular weight=126)

Blocked isocyanate group content: 11.00% (calculated as NCO; molecular weight=42)

Hydrazide group content: 0% (calculated as HN—NH; molecular weight=30)

EXAMPLE 6

(Comparison Example)

An aqueous blocked polyisocyanate (biuretized HDI), produced in accordance with Example 1, which was stabilized with hydrazide groups but contained no isocyanurate groups, was used as a comparison.

| Formulation: | | |
|---|---|---|
| 183.00 g | (1.00 equiv) | of a lacquer polyisocyanate produced in accordance with the process described in EP-A 150 769 (U.S. Pat. No. 4,613,686, herein incorporated by reference) and having an NCO content of 22.95% and a viscosity of 2750 mPa · s (23° C.) |
| 75.00 g | (0.10 equiv) | of the monohydroxy polyether of Example 1 |
| 69.70 g | (0.80 equiv) | of butanone oxime |
| 2.55 g | (0.03 equiv) | of IPDA |
| 2.61 g | (0.03 equiv) | of ASDH |
| 618.00 g | | of deionized water |

Method:

75.00 g of the monohydroxy polyether were introduced into a standard stirrer apparatus and heated to 90° C. 183.00 g of the lacquer polyisocyanate were rapidly stirred in. An NCO content of 14.48% was reached within approximately 30 minutes (theoretical NCO content: 14.65%). The reaction mixture was then cooled to 70° C. and 69.70 g of butanone oxime were added within approximately 30 minutes in such a manner that a temperature of 80° C. was not exceeded due to the exothermic reaction. When an NCO content of 0.93% was reached (theoretical NCO content: 1.28%), the reaction mixture was cooled to 70° C. and dispersed within approximately 30 minutes with thorough stirring into a solution of 2.55 g of IPDA and 2.61 g of ASDH in 618.00 g of deionized water (approximately 23° C.). A milky dispersion having a solids content of 35% and a draining time of 14 seconds (DIN 4/23° C.) was obtained. The NCO equivalent weight of the dispersion (based on the blocked isocyanate groups) was 1189.80 g. The blocked polyisocyanate had the following properties:

Isocyanurate group content: 0% (calculated as $C_3N_3O_3$; molecular weight=126)

Blocked isocyanate group content: 10.09% (calculated as NCO; molecular weight=42)

Hydrazide group content: 0.27% (calculated as HN—NH; molecular weight=30)

EXAMPLE 7

Clear coating compositions were prepared from the previously described polyester/polyacrylate dispersion (polyol component) and the blocked crosslinking agents from Examples 1 to 6. Coatings were then prepared from these compositions and tested for thermal yellowing.

1. Preparation of clear coating composition

The clear coating compositions were produced by mixing the blocked polyisocyanates of Examples 1 to 6 with the polyol component at a BNCO:OH equivalent ratio of 1:1 and adding the catalyst described below.

| Clear coating composition | Polyisocyanate | | Polyol component | Catalyst, 0.1% dibutyltin dilaurate |
|---|---|---|---|---|
| A | Example 1 | 1750.00 | 894.70 g | 2.65 g |
| B | Example 2 | 1409.40 g | 894.70 g | 2.30 g |
| C | Example 3 | 734.27 g | 894.70 g | 1.63 g |
| D | Example 4 | 2625.00 g | 894.70 g | 3.52 g |
| E | Example 5 | 954.55 g | 894.70 g | 1.85 g |
| F | Example 6 | 1189.80 g | 894.70 g | 2.08 g |

2. Application and thermal yellowing

The clear coating compositions were applied at a wet film thickness of approximately 120 to 150 μm onto metal test sheets coated with a conventional commercial white base lacquer (Spies & Hecker, Cologne). The metal test sheets were stored for 30 minutes at 140° C. in a drying cabinet. The first color measurement was then performed using the so-called CIE-LAB method. The higher the positive b value determined in this manner, the greater the yellow discoloration of the clear coating. Overstoving was then performed for 30 minutes at 160° C. The increase in yellowing, the so-called Δb value, was then measured using the CIE-LAB color system (DIN 6174). This value should be as close as possible to 0 for non-yellowing clear lacquers.

The results for clear lacquers A to F are summarized in the table below.

| Clear coating composition | Thermal yellowing after stoving (b) | Thermal yellowing after overstoving (Δb) | Film thickness (μm) |
|---|---|---|---|
| A | 1.2 | 0.3 | 40 |
| B | 1.0 | 0.0 | 40 |
| C | 0.8 | 0.0 | 45 |
| D | 4.3 | 8.0 | 40 |
| E | 3.8 | 5.3 | 45 |
| F | 1.9 | 1.2 | 40 |

The following is apparent from the results set forth in the table:

1) Clear coating D, which was prepared from a prior art blocked polyisocyanate and contained neither isocyanurate nor hydrazide groups, exhibited the severest yellowing. The sum of the yellowness values b+Δb was 12.3.

2) Clear coating E, which was prepared from a prior art blocked polyisocyanate and contained isocyanurate groups, but not hydrazide groups, exhibited a slight improvement in yellowing. The sum of the yellow values b+Δb was 9.1.

3) Clear coating F, which was prepared from a blocked polyisocyanate and contained hydrazide groups, but not isocyanurate groups, exhibited less yellowing than clear coatings D and E, but was still far from achieving the level of clear coatings A to C. The sum of the yellow values was 3.1.

4) In contrast, clear coatings A, B and C, which were prepared from the blocked polyisocyanates and contained both isocyanurate and hydrazide groups, were distinguished by a significant improvement in yellowing. The sum of the yellow values b+Δb was 1.5 for clear coating A, 1.0 for clear coating B and 0.8 for clear coating C, which was prepared from the blocked polyisocyanate containing the highest amount of isocyanurate and hydrazide groups.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous or water-dilutable blocked polyisocyanate, which is based on the reaction product of a) 40 to 80 wt. % of a polyisocyanate having an isocyanurate group content (calculated as $C_3N_3O_3$; molecular weight=126) of 2 to 30 wt. % and prepared from one or more diisocyanates having a molecular weight of 140 to 350 with b) 5 to 30 wt. % of one or more reversible blocking agents for isocyanate groups which are monofunctional for purposes of the isocyanate addition reaction, c) 0.5 to 15 wt. % of one or more stabilizing components which are mono- or difunctional for purposes of the isocyanate addition reaction and have 1 to 2 hydrazide groups and a molecular weight of 70 to 300, d) 5 to 30 wt. % of a non-ionic/hydrophilic structural component containing at least one compound which is mono- or difunctional for purposes of the isocyanate addition reaction and contains at least one lateral or terminal hydrophilic polyether chain, e) 0 to 15 wt. % of an anionic or potential anionic structural component containing one or more compounds having at least one isocyanate-reactive group and at least one group capable-of salt formation, which may optionally be present in at least partially neutralized form, f) 0 to 15 wt. % of one or more (cyclo)aliphatic polyamines having 2 to 3 amino groups and a molecular weight of 60 to 300 and g) 0 to 15 wt. % of one or more polyhydric alcohols having 2 to 4 hydroxyl groups and a molecular weight of 62 to 250, wherein the sum of the percentages of a) to g) is 100, based on the weight of components a) to g) and wherein the amounts of these components are selected such that i) the content of isocyanurate groups (calculated as $C_3N_3O_3$; molecular weight=126) is at least 2 wt. %, ii) the content of blocked isocyanate groups (calculated as NCO; molecular weight=42) is 5 to 11 wt. % and iii) the content of chemically bound hydrazide groups (calculated as HN—NH; molecular weight=30) is 0.1 to 3.0 wt. %.

2. An aqueous stoving composition which comprises the aqueous or water-dilutable blocked polyisocyanates of claim 1 and a water soluble or water dispersible polyhydroxyl compound.

* * * * *